Figure 1:
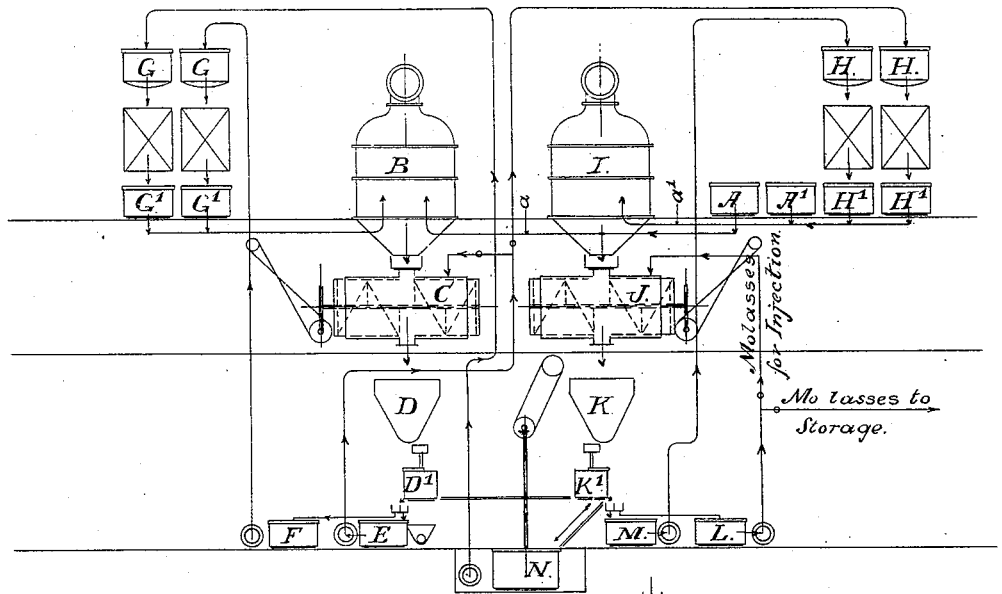

No. 643,848. Patented Feb. 20, 1900.
J. G. OXNARD & W. BAUR.
MAKING BEET SUGAR.
(Application filed Apr. 29, 1897.)

(No Model.)

WITNESS
Chapman W. Fowler

INVENTORS
James G. Oxnard & Wilhelm Baur
BY
T. Walter Fowler
Their ATTORNEY

THE NORRIS PETERS CO., PHOTO-LITHO., WASHINGTON, D. C.

UNITED STATES PATENT OFFICE.

JAMES G. OXNARD AND WILHELM BAUR, OF NEW YORK, N. Y., ASSIGNORS TO THE OXNARD CONSTRUCTION COMPANY, OF WEST VIRGINIA.

MAKING BEET-SUGAR.

SPECIFICATION forming part of Letters Patent No. 643,848, dated February 20, 1900.

Application filed April 29, 1897. Serial No. 634,448. (No specimens.)

*To all whom it may concern:*

Be it known that we, JAMES G. OXNARD, a citizen of the United States, and WILHELM BAUR, a subject of the Emperor of Germany, and both residents of New York, in the county of New York and State of New York, have invented certain new and useful Improvements in Processes of Manufacturing Standard Granulated and White Sugar from Sugar-Beets, of which the following is a specification, reference being had therein to the accompanying drawings.

Our invention relates to a process of manufacturing standard granulated and white sugar from sugar-beets without making any other final product, except molasses; and our invention consists of the process which we shall hereinafter fully describe and claim.

Our invention relates to a process of manufacturing granulated sugar from beet-juice and wherein the said juice is clarified and filtered in the usual well-known manner, so that it may be boiled *in vacuo* to produce a granulated-sugar masse-cuite. One portion of this clarified and filtered juice has added to it the clairce derived from washing a previous straight strike and also a masse-cuite of raw sugar from a mixed strike, when the mixture is boiled to produce a straight-strike or a granulated-sugar masse-cuite. The temperature of this masse-cuite is then lowered and the masse-cuite is agitated or kept in motion, and during this period of cooling and agitation there is added to the masse-cuite a portion of first molasses purged from a straight-strike or granulated-sugar masse-cuite and the masse-cuite is purged in the centrifugal and washed to white sugar and the first molasses and clairce collected separately, so that the clairce may be added to clarified and filtered fresh juice and washed and melted raw sugar, as hereinafter described. The greater portion of the first molasses purged from the straight-strike or granulated-sugar masse-cuite is designed for boiling in a mixed strike with another portion of clarified and filtered fresh juice and with a clairce obtained from washing a masse-cuite of raw sugar. This latter masse-cuite is then cooled and agitated and has added to it during the cooling process a sufficient amount of final molasses purged from a raw-sugar masse-cuite to maintain the masse-cuite of substantially uniform fluidity. The masse-cuite is then purged in the centrifugal and the resulting final molasses and clairce obtained from washing the masse-cuite are collected in different vessels, one portion of the final molasses being designed for use with another masse-cuite of raw sugar and another and greater portion being sent to storage. When the final molasses stops running from the masse-cuite of raw sugar, the masse-cuite is washed to a high test and the clairce obtained from this washing is added to clarified and filtered fresh juice and the first molasses purged from a straight-strike or granulated-sugar masse-cuite to make a raw-sugar masse-cuite, which is washed and melted and combined with fresh juice and clairce obtained from washing a raw-sugar masse-cuite and boiled straight to produce a granulated-sugar masse-cuite, as before pointed out.

The object of our invention is to extract all of the sugar from beet-juices and to manipulate those juices so that all of the sugar obtainable from the juices will be in the form of granulated sugar and molasses.

Figure 2:
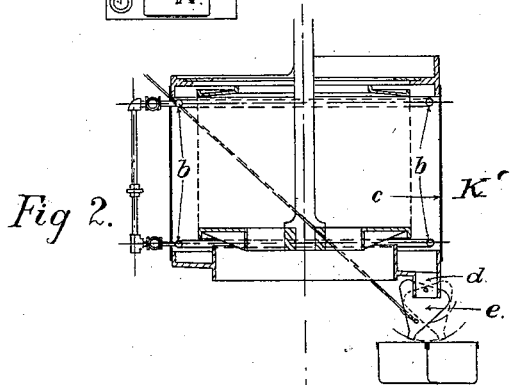
Figure 3:
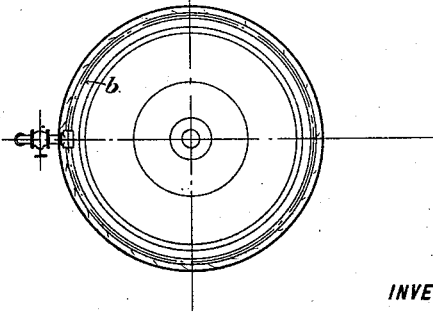

In the drawings hereto annexed, Figure 1 illustrates a diagrammatic figure of an apparatus by which our process may be carried out. Figs. 2 and 3 are vertical and horizontal sectional views of the centrifugal.

We will now describe our process in full, reference being had to the accompanying drawings.

The juices which have been clarified and concentrated in the ordinary manner are received into the tanks A A' as a thick clarified juice. A portion of this juice is then led by a pipe *a* to the vacuum-pan B and boiled straight therein for a granulated-sugar masse-cuite. Another portion—that remaining in tank A', for instance—is reserved to be used at a subsequent stage, as will presently be indicated. This pan B we hereinafter refer to as the "first" pan to distinguish it from the "second" pan I. The masse-cuite in the first pan is discharged into a closed vessel or crystallizer C, provided with a cooling-jacket and means for stirring the masse-cuite, and is left therein for a sufficient time to enable it to be cooled down ready to go to the centrifugals. During this process of cooling the masse-cuite will get stiffer and more dense, which will increase the power necessary to do the work of stirring to a great extent. To avoid this and and also to foster the growth and movement of the individual crystals, we inject into the masse-cuite in the process of cooling and stirring first molasses previously obtained, and we add this in such quantities that the masse-cuite will remain always of about the same consistency it was when leaving the pan at a higher temperature. The masse-cuite is then discharged into a centrifugal mixer D, of any suitable and well-known type, and purged or spun off in the centrifugal D' in the usual manner. In this instance, however, the centrifugals D' are provided with perforated coils $b$, which are arranged in such a manner that by means of hot water or steam forced through the coils and perforations the inner walls of the outer baskets $c$, as well as the collecting-gutter $d$, are thoroughly washed and freed from the syrup adhering to them. The gutter $d$ has connected with it a movable nozzle $e$ to enable the operator to direct the outflow of the various syrups coming from this centrifugal into different channels or gutters, the purpose of which arrangement will be manifest from the following:

The centrifugal just described forms the subject-matter of and is shown, described, and claimed in another application filed by us June 18, 1897, Serial No. 641,307.

The masse-cuite is dropped from the mixer D into the centrifugal D', of which the inner wall of the outer basket and gutter has been washed, as just described, and the centrifugal is run until the first molasses stops running from the masse-cuite. The first molasses or green syrup is directed by the nozzle into a gutter and finally is collected in a tank E and is set aside to be used later on in the second pan. Before the steam or hot water is turned on in the coils to wash the centrifugal the movable outlet or nozzle $e$ may be turned to discharge into the second gutter or trough F to carry off separately the clairce obtained from washing the masse-cuite, the said first molasses and clairce being thus kept separate from each other. After the sugar remaining in the centrifugal is washed to white sugar and before the machine is stopped the water or steam should be turned on into the outer basket and the collecting-gutter thereof should be thoroughly cleansed to remove all particles of high-testing clairce. The clairce received in the troughs F are to be delivered by a pump, for instance, into the blow-ups G and clarified and received into the tank G' and finally sent to the first pan. The sugar obtained from this first-pan masse-cuite will be white sugar ready for the granulator.

The first molasses or green syrup which has been extracted from the masse-cuite of the first pan by the centrifugal action of the machines is collected in a tank or vessel E and diluted with water to about the density of thick juice, clarified and filtered in the usual manner, and is then ready to be boiled in the vacuum-pan I with that part of the thick juice reserved for this purpose, as before mentioned. To further this operation, the tank A', containing the portion of the thick juice originally reserved, is connected with the second vacuum-pan I by means of pipe $a'$, and the first molasses or green syrup in the tank or vessel E is pumped or otherwise delivered into the blow-ups H and will be clarified, as usual, and delivered in the storage-tanks H' and finally into the second vacuum-pan with the aforesaid reserved thick juice. The mixture in the second pan I is lower in purity than the first pan and is boiled in this vacuum-pan I for raw-sugar masse-cuite, together with the clairce obtained from washing a raw-sugar masse-cuite to a high test, as we will presently disclose.

The masse-cuite of the second pan is dropped into a closed vessel or crystallizer J, provided with a cooling-jacket and means for stirring the masse-cuite, and is left therein for about eighteen to thirty hours or more to enable it to be cooled to a temperature of between 90° to 100° Fahrenheit. During this process of cooling the masse-cuite will get stiffer and stiffer, which will increase the power necessary to do the work of stirring to a great extent. To avoid this and also to foster the growth and movement of the individual crystals, we inject into the masse-cuite during the stage of cooling and stirring final molasses previously obtained and in such quantities that the masse-cuite will remain always of about the same fluidity or consistency as it was when leaving the vacuum-pan at a higher temperature. The masse-cuite of the second pan is then discharged into the centrifugal mixer K, of any suitable or well-known type, and purged or spun off in the centrifugal K' in the usual manner. These centrifugals K' are constructed like those for the first pan and are provided with perforated coils $b$, which are arranged in such a manner that by means of steam or hot water forced through the coils and perforations the inner walls of the outer basket $c$, as well as the collecting-gutter $d$, are thoroughly washed and freed from the syrup adhering to them. The gutter $d$ has also a movable nozzle $e$ to enable the operator to direct the outflow of the various syrups coming from this centrifugal and to separate and collect them into different channels or gutters, the purpose of which arrangement will be manifest from the following: The masse-cuite being dropped from the mixer K into the centrifugal K', of which the inner wall of the outer basket and gutter has been washed, as just described, the centrifugal is run until the final molasses stops running from the masse-cuite. If the masse-cuite from the second pan has been treated as above described, it will be found that the fluid matter resulting from the treatment is of final molasses purity. The sugar remaining in the centrifugals is of the raw-sugar type and before being removed from the centrifugals is washed to a high test by means of water or steam to a high purity. The clairce obtained from this washing is returned into the second pan and the sugar remaining in the centrifugals is stored for remelting and is dropped in a melter N, where it will be dissolved in the presence of heat and water until it is about the density of the thick juice, then clarified and filtered in the usual manner, and is then ready to go, together with clarified and filtered fresh juice and the first molosses of a first pan, into the first pan to be boiled for granulated-sugar masse-cuite. By this means we will recover all the sugar from juice from the beets and utilize it to produce granulated sugar only, as all lower sugars produced during the process have been remelted and clarified to such a high purity that they can be boiled for granulated-sugar masse-cuite, so that the only products of the process previously described will be granulated sugar and molasses.

Having thus described our invention, what we claim as new, and desire to secure by Letters Patent, is—

1. The process herein described of manufacturing granulated sugar from beets which consists, essentially, in producing a granulated masse-cuite from clarified beet-juice; and purging and separately collecting the first molasses and clairce; then adding first molasses to fresh juice and the clairce used in washing a final raw-sugar masse-cuite and producing therefrom a final raw-sugar masse-cuite; then agitating and reducing the temperature of this final raw-sugar masse-cuite and adding during the cooling process, sufficient final molasses to maintain the masse-cuite of uniform fluidity; then purging the masse-cuite and washing the same to a high test and collecting the resulting final molasses and clairce separately; then dissolving the final and washed raw sugar and clarifying and filtering the sugar solution and adding the same to clarified fresh juice and the aforesaid and clarified clairce used in washing the first or granulated masse-cuite, and finally boiling, purging and washing to produce another granulated-sugar masse-cuite; all of the lower sugars produced during the process being washed to a high test, melted and clarified and boiled for granulated sugar whereby the only products of the process are granulated sugar and final molasses.

2. The process herein described of manufacturing granulated sugar from beets which consists, essentially, in boiling clarified and filtered beet-juice to strike; then agitating and cooling the masse-cuite and adding first molasses thereto during the cooling process; purging the masse-cuite and separately collecting the first molasses and the clairce produced in washing the masse-cuite; then combining first molasses and the clairce used in washing a final raw-sugar masse-cuite, with clarified and filtered beet-juice and boiling to strike; then agitating and cooling the final raw-sugar masse-cuite; then purging this final raw-sugar masse-cuite and washing the same to a high test, and separately collecting the resulting final molasses and clairce; then dissolving this final and washed raw sugar and clarifying and filtering the sugar solution, and adding the same to clarified fresh juice and the clarified clairce of the straight strike and boiling to strike.

3. The process herein described of manufacturing granulated sugar from beets, which consists, essentially, in combining the first molasses purged from a granulated-sugar masse-cuite with thick clarified juice and with the clairce used in washing a final raw sugar and boiling the mixture to produce another final raw sugar; then purging, washing to a high test, dissolving, clarifying and filtering this final raw sugar and adding the same to fresh juice and the clairce of a first or straight strike and boiling to grain.

4. The process herein described of manufacturing granulated sugar from beets, which consists, essentially, in boiling a thick clarified juice to produce a granulated-sugar masse-cuite and subjecting the same to centrifugal action and washing, and separating the purged first molasses and clairce from each other; then combining the first molasses with thick clarified juice and a clairce produced from washing a final raw sugar and boiling the mixture *in vacuo* to produce a masse-cuite of final raw sugar; then lowering the temperature of and agitating the final raw sugar and adding, during the process of cooling and while the material is in motion, a final molasses purged from raw sugar; then subjecting the final raw-sugar masse-cuite to centrifugal action to purge its final molasses, and washing the final raw sugar to a high test and collecting the clairce separate from the final molasses, and returning the clairce for reuse with thick clarified juice and first molasses, and finally melting the final raw sugar and clarifying and filtering the sugar solution and combining it with thick clarified juice and the clairce used in washing a granulated masse-cuite, to form a second masse-cuite producing granulated sugar.

In testimony whereof we affix our signatures in presence of two witnesses.

JAMES G. OXNARD.
WILHELM BAUR.

Witnesses:
J. G. HAMILTON,
G. DAUKEEN.